United States Patent
Yokoyama et al.

(10) Patent No.: US 8,044,545 B2
(45) Date of Patent: Oct. 25, 2011

(54) DIRECT-CURRENT MOTOR

(75) Inventors: Masayuki Yokoyama, Chiyoda-ku (JP); Youichi Fujita, Chiyoda-ku (JP); Sotsuo Miyoshi, Chiyoda-ku (JP); Naohiro Oketani, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 160 days.

(21) Appl. No.: 12/516,400

(22) PCT Filed: Nov. 26, 2007

(86) PCT No.: PCT/JP2007/072733
§ 371 (c)(1),
(2), (4) Date: Jul. 10, 2009

(87) PCT Pub. No.: WO2008/096495
PCT Pub. Date: Aug. 14, 2008

(65) Prior Publication Data
US 2010/0060094 A1    Mar. 11, 2010

(30) Foreign Application Priority Data
Feb. 2, 2007    (JP) .................... 2007-024140

(51) Int. Cl.
*H02K 5/16* (2006.01)
(52) U.S. Cl. .................................... 310/90
(58) Field of Classification Search ............... 310/43, 310/67 R, 90, 91
See application file for complete search history.

(56) References Cited

U.S. PATENT DOCUMENTS

| | | | |
|---|---|---|---|
| 4,629,919 A * | 12/1986 | Merkle | 310/90 |
| 4,773,262 A * | 9/1988 | Girard et al. | 73/147 |
| 5,683,183 A * | 11/1997 | Tanaka et al. | 384/100 |
| 6,091,568 A * | 7/2000 | Gilliland | 360/97.02 |
| 6,365,994 B1 * | 4/2002 | Watanabe et al. | 310/49.01 |
| 6,378,839 B2 * | 4/2002 | Watanabe et al. | 251/129.11 |
| 6,488,259 B1 * | 12/2002 | Fujita et al. | 251/129.11 |

FOREIGN PATENT DOCUMENTS

| | | |
|---|---|---|
| CN | 1806376 A | 7/2006 |
| JP | 53-092405 A | 8/1978 |
| JP | 62-134769 U | 8/1987 |

(Continued)

OTHER PUBLICATIONS

Notice of Reason for Rejection mailed Sep. 21, 2009 in corresponding Japanese Patent Application No. 2008-525289.

(Continued)

*Primary Examiner* — Tran Nguyen
(74) *Attorney, Agent, or Firm* — Sughrue Mion, PLLC

(57) ABSTRACT

To provide a DC motor in which the rattling and the axial deviation of a rotor are restrained without increasing the axial dimension of the motor.
This DC motor comprises a stator (2) on which coils (4) are provided, a rotor (8) so disposed as to be opposed to the inner periphery of the stator (2) and having magnetic poles, a current-carrying part provided at one end of the rotor (8) and transferring the current fed from a power supply to the coils (4) of the stator (2), a sleeve bearing (6) holding the rotor (8), and a ball bearing (7) holding the rotor (8) and having a load-carrying capacity larger than that of the sleeve bearing (6). The outer ring of the ball bearing (7) is positioned by the stator (2), and the inner ring of the ball bearing (7) is positioned by the rotor (8).

5 Claims, 3 Drawing Sheets

FOREIGN PATENT DOCUMENTS

| | | | |
|---|---|---|---|
| JP | 05-252683 | A | 9/1993 |
| JP | 06335226 | A * | 12/1994 |
| JP | 2000-037069 | A | 2/2000 |
| JP | 2000-230657 | A | 8/2000 |
| JP | 2000-324745 | A | 11/2000 |
| JP | 2002-037104 | A | 2/2002 |
| JP | 2003232424 | A | 8/2003 |
| JP | 2004260950 | A | 9/2004 |
| JP | 2005-218146 | A | 8/2005 |
| JP | 2005-261029 | A | 9/2005 |
| JP | 2006-271193 | A | 10/2006 |
| JP | 2006340553 | A | 12/2006 |
| JP | 2007014187 | A | 1/2007 |
| WO | 01-05018 | A1 | 1/2001 |
| WO | 03/019749 | A | 3/2003 |

OTHER PUBLICATIONS

Interrogation mailed Apr. 27, 2010 in corresponding Japanese Patent Application No. 2008-525289.

* cited by examiner

DIRECT-CURRENT MOTOR

CROSS REFERENCE TO RELATED APPLICATION

This application is a National Stage of International Application No. PCT/JP2007/072733 filed Nov. 26, 2007, claiming priority based on Japanese Patent Application No. 2007-024140, filed Feb. 2, 2007, the contents of all of which are incorporated herein by reference in their entirety.

TECHNICAL FIELD

The present invention relates to a direct-current motor and the like that is used, for example, for driving an exhaust gas recirculation (EGR) valve apparatus for configuring an exhaust-gas recirculation system.

BACKGROUND ART

A conventional DC motor is constructed in such a manner that bearings that support its rotor are axially biased by biasing members such as spring washers to prevent the rotor from wobbling and axially displacing (for example, refer to Patent Document 1).

Another conventional motor is constructed in such a manner that its stator and bearings are insert-molded to improve their concentricity (for example, refer to Patent Document 2).
Patent Document 1: International Patent Application Publication No. WO01/005018 (FIG. 2), and
Patent Document 2: Japanese Patent Application Publication No. 2005-218146A (paragraphs [0011] and [0005]

In the DC motor disclosed in Patent Document 1, rotor supporting bearings are held axially in position by being biased axially using, for example, biasing members such as spring washers to prevent the rotor from wobbling and axially displacing. However, in the DC motor, although the rotor is held in position with respect to the bearings by the spring washers, the bearings are not set in position with respect to the stator. In other words, since the stator and the rotor are not set in position with respect to each other, their positions become inaccurate, which has resulted in a problem causing wobble and axial displacement of the rotor.

While it is conceivable, as with the motor disclosed in Patent Document 2, that bearings are held axially in position by insert-molding the bearings and the stator, the bearings and the rotor in the motor are not axially positioned with respect to each other, which has led to a problem causing wobble and axial displacement of the rotor when an external force is axially applied to the rotor.

SUMMARY OF THE INVENTION

The present invention is made to address such problems as described above, and is to provide a DC motor that is able to prevent wobble and axial displacement of its rotor.

A direct-current motor according to the invention includes a stator having a plurality of coils arranged thereon; a rotor having a plurality of magnetic poles arranged facing the inner periphery of the stator; a current-carrying part provided on one end portion of the rotor, for commutating a current supplied from a power source to feed the current to the coils of the stator; a bearing for supporting the rotor; and a ball bearing for supporting the rotor, having a higher load-bearing capacity compared to that of the bearing; wherein the outer ring of the ball bearing is held in position with respect to the stator, and the inner ring of the ball bearing is held in position with respect to the rotor.

According to the present invention, a DC motor can be obtained that is able to prevent wobble and axial displacement of its rotor.

BRIEF DESCRIPTION OF THE DRAWINGS

FIG. 3 shows a current flow in a current carrying part 19 of the DC motor shown in FIG. 1, where

DETAILED DESCRIPTION

Embodiment 1

An embodiment of the present invention will be described hereinafter with reference to the drawings.

Figure 1:
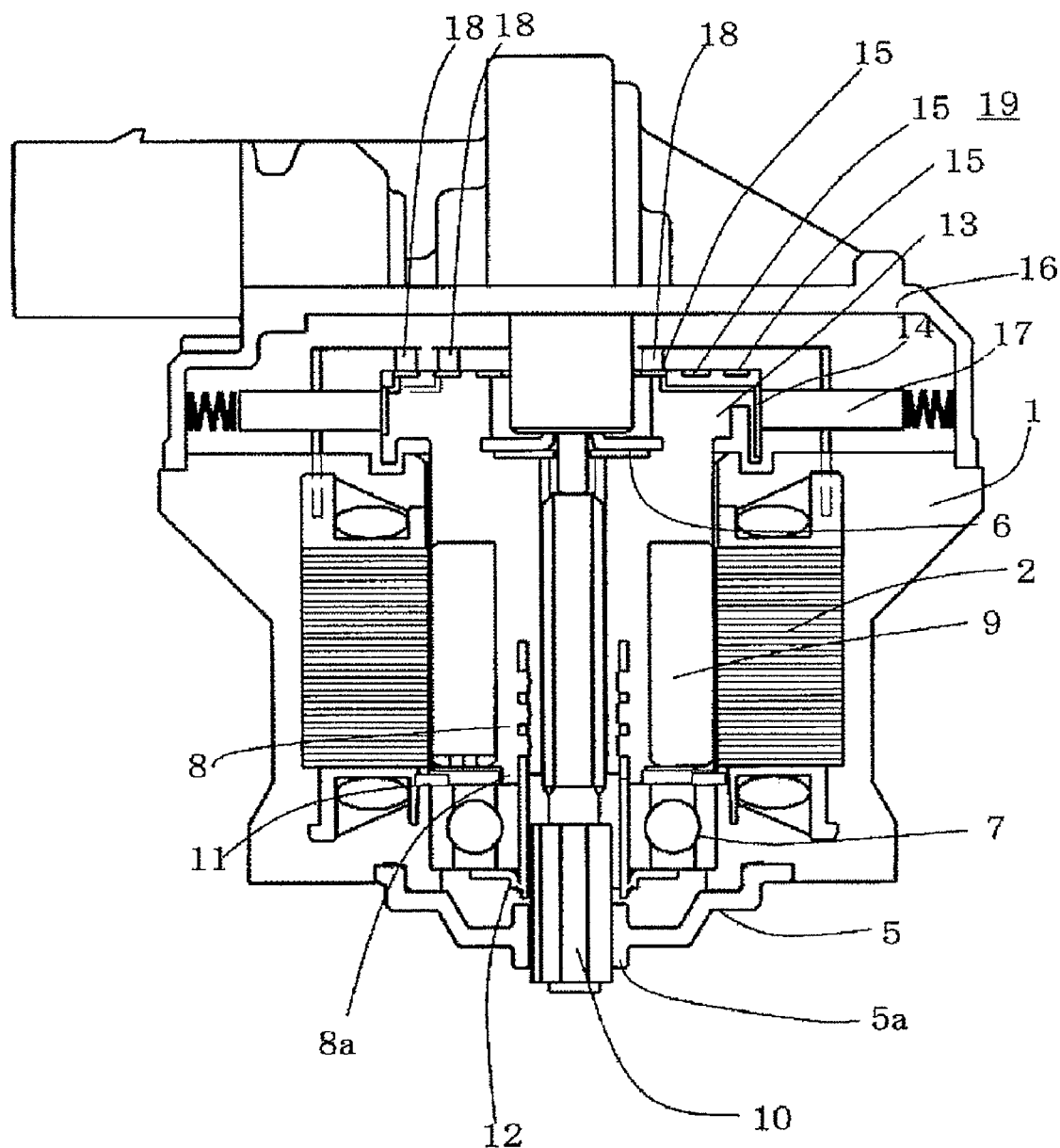
FIG. 1 is a cross-sectional view illustrating a structure of a DC motor according to Embodiment 1 of the present invention.

FIG. 1 is a cross-sectional view illustrating a structure of a direct-current motor according to Embodiment 1 and FIG. 2 shows plan views illustrating a manufacturing process of a stator 2 of the DC motor shown in FIG. 1.

Figure 2A:
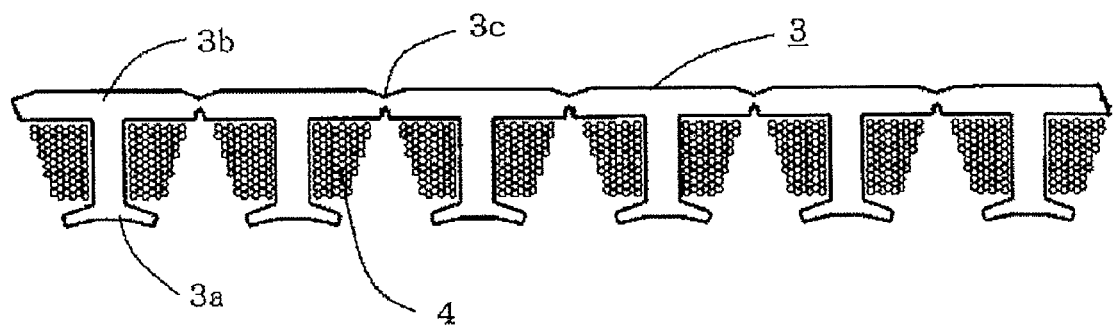
FIG. 2 shows plan views illustrating a manufacturing process of a stator 2 of the DC motor shown in FIG. 1.
Figure 2B:
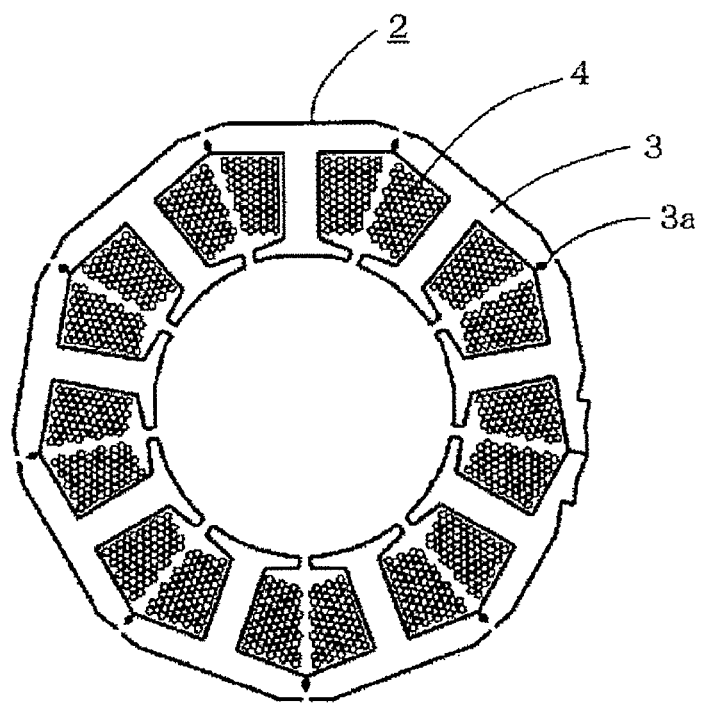

In FIG. 1, a motor case 1 is formed of a resin material and the stator 2 is formed by resin-molding together with the motor case 1. As shown in FIG. 2A, core plates 3b, made of a magnetic material, each have magnetic pole teeth 3a protruding therefrom and narrow portions 3c, and are stacked in a predetermined number to form a stator core 3. Coils 4 are wound around the magnet pole teeth 3a by a winding machine (not shown) with the stator core 3 being in the state shown in FIG. 2A for ease of winding. After that, the stator 2 is formed into a circular shape, as shown in FIG. 2B, by bending the narrow portions 3c.

A flange member 5, formed with a protruding boss 5a at the center thereof to support a shaft 10, is attached to one end of the motor case 1. Numerals 6 and 7 denote a sleeve bearing and a ball bearing, respectively, and the ball bearing 7 has a higher load bearing capacity compared to the sleeve bearing 6. Employing the sleeve bearing 6 for one of the sleeves permits a current-carrying part 19 and the sleeve bearing 6 to be arranged in substantially the same plane without an increase in radial size of the DC motor, because the sleeve bearing 6 is smaller in diameter compared to the ball bearing 7. The axial size of the DC motor can thereby be made smaller than that of a conventional DC motor that uses two ball bearings.

Since the ball bearing 7 bears a major part of the load from a rotor 8, the size of the ball bearing 7 would be larger in both radial and axial directions than that of a ball bearing used in the conventional DC motor. However, since the rotor 8 is made of resin, by adjusting the amount of resin for the rotor 8 according to increase in size of the ball bearing 7, the size of the present DC motor does not increase axially and radially. That is, although the ball bearing 7 would have a larger size than that of the conventional two-ball-bearing DC motor, the size of the DC motor with the sleeve bearing 6 and the ball bearing 7 never increases axially. Moreover, since the current-carrying part 19 and the sleeve bearing 6 can be arranged in substantially the same plane, the DC motor with the sleeve bearing 6 and the ball bearing 7 can be made smaller in axial size than the conventional two-ball-bearing DC motor.

Furthermore, the outer ring of the ball bearing 7 is insert-molded with the stator 2. By thus insert-molding the ball bearing 7 and the stator 2, they are held in position with respect to each other.

The rotor 8 has a plurality of permanent magnets 9 arranged on its outer portions corresponding to the magnetic pole teeth 3a and is supported at both ends by the sleeve bearing 6 and the ball bearing 7. The inner ring of the ball bearing 7 is in contact with an end portion 8a of the rotor 8. The shaft 10 is movable linearly in the axial direction in proportion to revolutions of the rotor 8. When the DC motor is used, for example, in an EGR valve apparatus, valve members (not shown) that open and close between exhaust and intake channels (not shown) linearly move in the axial direction in accordance with the axial linear movement of the shaft 10, thereby to recirculate a part of exhaust gas to the intake channel or to adjust the amount of exhaust gas to be recirculated.

A plate 11 is interposed between the ball bearing 7 and the rotor 8, for axially positioning the outer ring of the ball bearing 7. A pipe 12 that is a metal member is disposed on one end portion of the rotor 8, for positioning the inner ring of the ball bearing 7 and the rotor 8. The inner ring of the ball bearing 7 and the rotor 8 are axially positioned with respect to each other by the pipe 12 with another member such as a metal plate welded or swaged on one end thereof. Moreover, since the inner periphery of the ball bearing 7 is in direct contact with the pipe 12 disposed on the one end portion of the rotor 8 and the outer periphery of the ball bearing 7 is in direct contact with the stator 2, the ball bearing 7 is held in radial position.

A circular plate 13 is formed integrally with the rotor 8 at the other end thereof and rotates therewith. Commutators 14 are circumferentially formed in plural segments around the circular plate 13. The contact surfaces of the commutators 14 are formed to face the radial direction. Slip rings 15 are formed in n separate concentric rings (three rings in the figure) inside the commutators 14, and the contact surfaces of the slip rings 15 are formed to face the axial direction. A bracket 16 is mounted on the other end of the motor case 1.

A pair of first brushes 17 are insulatively supported by the bracket 16 and pressed radially inwards by a predetermined force by elastic members such as coil springs so that their inner ends are brought into slidable contact with the contact surfaces of the commutators 14. Three second brushes 18 are insulatively supported by the bracket 16 and axially pressed by a predetermined force by elastic members such as springs so that the top ends of the brushes are bought into slidable contact with the contact surfaces of the slip rings 15. Here, the current-carrying part 19 is made up of the circular plate 13, the commutators 14, and the slip rings 15.

Next, an explanation will be made on an operation of the DC motor constructed as described above according to Embodiment 1.

Figure 3A:
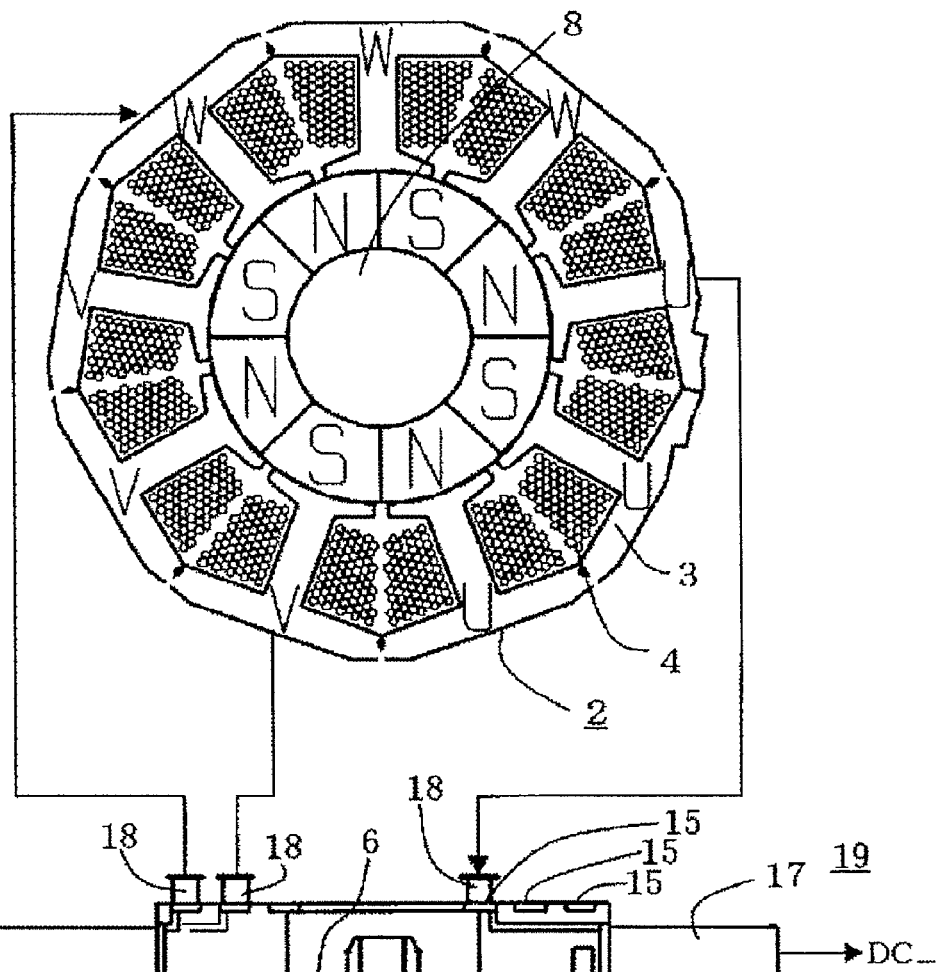
FIG. 3A is a plan view of the stator 2 and a rotor 8 and FIG. 3B is a cross-sectional side view of the DC motor.
Figure 3B:
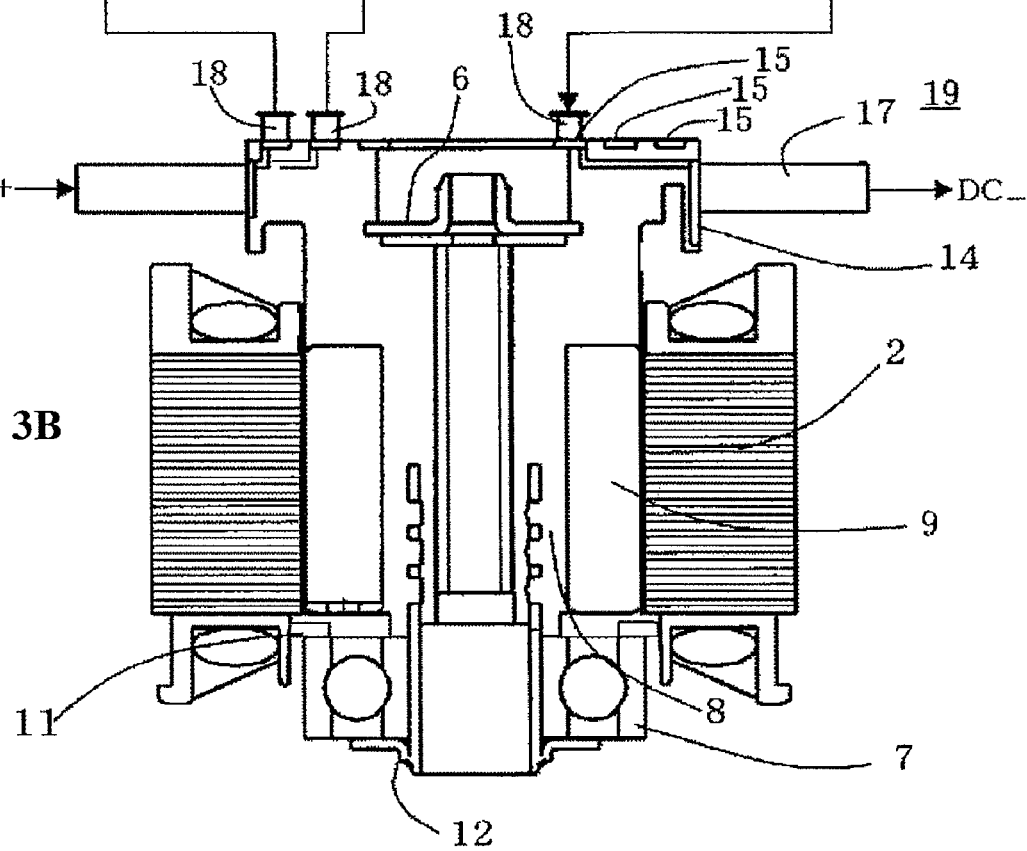

FIG. 3 shows a current flow in the current-carrying part 19 of the DC motor shown in FIG. 1, where FIG. 3A is a cross-sectional plan view of the stator 2 and the rotor 8, and FIG. 3B is a cross-sectional side view of the DC motor.

As shown in FIGS. 3A and 3B, when a direct current flows in from a power source (not shown) (DC+) through one of the first brushes 17, the current is commutated by the commutators 14 and passes through a corresponding one of the slip rings 15, to be fed to the stator 2 through a corresponding one of the second brushes 18. The current, after passing through the coils 4, passes again though another second brush 18, another slip ring 15, and another commutator 14, and flows back to the power source (DC−) through the other first brush 17.

Then, torque is generated in the rotor 8 by the interaction between magnetic flux produced by the current flowing through the coils 4 and the permanent magnets 9 of the rotor 8. Since the circular plate 13 is also rotated by the torque, change in combination of a first brush 17 and a commutator 14 that contacts the brush successively changes the coils 4 through which the current flows, whereby the rotor 8 starts continuous rotation, so that the shaft 10 is moved linearly in the axial direction in proportion to revolutions of the rotor 8.

In the case of using the DC motor, for example, in the EGR valve apparatus, the valve members (not shown) that open and close between the exhaust and the intake channels (not shown) linearly move in the axial direction in accordance with the axial linear movement of the shaft 10, thereby to recirculate a part of exhaust gas to the intake channel or to adjust the amount of exhaust gas to be recirculated.

As for wobble and axial displacement of the rotor 8, they arise from, for example, rotation of the rotor 8, reaction force acting thereon, or positional accuracy between the rotor 8 and the stator 2. Since the shaft 10 of the DC motor linearly moves in the axial direction in proportion to revolutions of the rotor 8, the reaction force acting on the rotor 8 is caused by the linear movement of the shaft 10. However, with the above-described construction, the outer ring and the inner ring of the ball bearing 7 are set in position with respect to the stator 2 and the rotor 8, respectively, so that positional accuracy between the stator 2 and the rotor 8 is improved, making it possible to prevent wobble and axial displacement of the rotor 8 caused by rotation thereof, reaction force acting thereon, or positional inaccuracy between the rotor 8 and the stator 2.

Namely, in the DC motor according to Embodiment 1 of the invention, since the inner ring of the ball bearing 7 is set in position with respect to the rotor 8 and the outer ring of the ball bearing 7 is also set in position with respect to the stator 2, the ball bearing 7, the stator 2, and the rotor 8 are set in position with respect to each other. For that reason, positional accuracy between the rotor 8 and the stator 2 is improved, so that the rotor 8 can be prevented from wobbling and axially displacing.

Moreover, in the DC motor according to Embodiment 1, the outer ring of the ball bearing 7 and the stator 2 are insert-molded to be held in position with respect to each other, whereby their concentricity can be improved, allowing positional accuracy between the ball bearing 7 and the stator 2 to be further enhanced.

Furthermore, in the DC motor according to Embodiment 1, the plate 11 is interposed between the ball bearing 7 and the rotor 8 to hold axially the outer ring of the ball bearing 7 in position. Since the plate 11 is made of metal, interposing of the plate 11 holds the ball bearing 7 and the stator 2 in position with greater strength compared with a case in which they are held in position by using resin. For that reason, even when the rotor 8 is subject to a large reaction force while the shaft 10 linearly moves, the outer ring of the ball bearing 7 and the stator 2 can be held in position. Furthermore, since the outer ring of the ball bearing 7 is in contact with the plate 11, the bearing surface of the ball bearing 7 is kept stable. The stability of the bearing surface prevents the rotor 8 from wobbling, so that rotational accuracy of the rotor 8 can be enhanced and loss due to sliding can be reduced.

Furthermore, it is more preferable that the plate 11 is made of a nonmagnetic material. If the plate 11 is made of a magnetic material, not a nonmagnetic one, magnetic flux produced by the stator 2 leaks through the ball bearing 7, which reduces performance of the DC motor. Since making the plate 11 of a nonmagnetic material allows preventing the magnetic flux produced by the stator 2 from leaking through the ball bearing 7, the DC motor can be finely controlled without reducing its performance.

Furthermore, in the DC motor according to Embodiment 1, the inner ring of the ball bearing 7 and the rotor 8 are held axially in position with respect to each other by another member such as a metal plate welded or swaged on one end of the pipe 12 provided on one end portion of the rotor 8. The pipe 12 is in direct contact with the inner periphery of the ball bearing 7. In a conventional DC motor, while positions of a ball bearing 7 and a rotor 8 are held radially by the rotor 8, strength for holding radially the inner ring of the ball bearing 7 and the rotor 8 in position is a resin level because the rotor 8 is made of resin. However, in the present DC motor, since the pipe 12 is made up of a metal member and is in direct contact with the inner periphery of the ball bearing 7, a metal level strength can be ensured for holding radially the inner ring of the ball bearing 7 and the rotor 8 in position, so that the holding strength can be improved, whereby its durability is also improved.

What is claimed is:

1. A direct-current motor comprising:
    a stator having a plurality of coils arranged thereon;
    a rotor having a plurality of magnetic poles arranged facing an inner periphery of said stator;
    a current-carrying part provided on one end portion of said rotor, for commutating a current supplied from a power source to feed the current to the coils of said stator;
    a ball bearing for supporting said rotor;
    a bearing for supporting said rotor, having a lower load-bearing capacity compared to that of said ball bearing, and at least a part of said bearing being accommodated in an opening formed in said current-carrying part; and
    a metal member being in contact with an outer ring of said ball bearing, the outer ring of said ball bearing insert-molded with said stator,
    wherein:
    said rotor is provided with a second metal member on the other end portion thereof such that the second metal member is in direct contact with an inner periphery of said ball bearing to hold an inner ring of said ball bearing and said rotor in position with respect to each other,
    a portion of the second metal member is provided along the inner periphery of the ball bearing such that the portion of the second metal member is disposed between the rotor and the inner periphery of the ball bearing.

2. The direct-current motor of claim 1, wherein said metal member is a plate interposed between said ball bearing and said rotor, for holding axially the outer ring of said ball bearing in position.

3. The direct-current motor of claim 2, wherein the plate is made of a nonmagnetic material.

4. The direct-current motor of claim 1, wherein said rotor is provided with a pressing member for pressing an inner ring of said ball bearing in a reverse direction in which said rotor presses the inner ring of said ball bearing.

5. The direct-current motor of claim 1, wherein the second metal member includes a portion swaged at one end of the portion of the second metal member provided along the inner periphery of the ball bearing.

* * * * *